United States Patent [19]

Lindoy et al.

[11] Patent Number: 5,190,660

[45] Date of Patent: Mar. 2, 1993

[54] ION COMPLEXATION BY SILICA-IMMOBILIZED POLYETHYLENEIMINES

[76] Inventors: Leonard F. Lindoy, 3 Jarrah Court, Cranbrook, Queensland, Australia, 4811; Peter Eaglen, 22 Harvey Street, Gulliven Townsville, 4812, Queensland, Australia

[21] Appl. No.: 893,925

[22] Filed: Jun. 4, 1992

[51] Int. Cl.⁵ .................. B01D 15/04; B01D 15/08
[52] U.S. Cl. ............................ 210/670; 210/688; 210/679
[58] Field of Search ............ 210/670, 677, 679, 688; 204/186

[56] References Cited

U.S. PATENT DOCUMENTS

| | | |
|---|---|---|
| 4,540,486 | 9/1985 | Ramsden ..................... 210/198.2 |
| 4,721,573 | 1/1988 | Ramsden et al. ............ 210/635 |
| 5,066,395 | 11/1991 | Ramsden et al. ............ 210/198.2 |
| 5,087,359 | 2/1992 | Kakodkar et al. ........... 210/198.2 |
| 5,092,992 | 3/1992 | Crane et al. ................. 210/198.2 |

Primary Examiner—Wilbur Bascomb, Jr.
Assistant Examiner—Cynthia L. Nessler
Attorney, Agent, or Firm—Kyle W. Rost

[57] ABSTRACT

Metal ions are removed from solution by complexing with an immobilized polyethyleneimine, formed by first bonding a silane-propyl bridge to a substrate particle of silica or silicate, larger than 200 mesh. Then, polyethyleneimine is covalently bonded by a nitrogen to the bridge. Due to the spacing established by the bridge between the polyethyleneimine and substrate, the polyethyleneimine maintains high ion complexation capacity.

16 Claims, No Drawings

ION COMPLEXATION BY SILICA-IMMOBILIZED POLYETHYLENEIMINES

TECHNICAL FIELD

The invention generally relates to organic chemistry and organic compounds. More specifically, the invention relates to linear and branched amines. The invention also relates to liquid purification and separation, especially to a method of removing ions from solution by exposure to bound polyethyleneimine.

BACKGROUND ART

Simple linear amines are straight chain compounds that contain nitrogen in the molecular chain. Examples include ethylenediamine, diethylenetriamine, triethylenetetramine, and tetraethylenepentamine. These amines are commercially available as mixtures of branched and linear molecules of a predetermined molecular weight range. For example, tetraethylenepentamine is generally available in the molecular weight range centered on 189.

Simple linear amines are known to form complexes with cations. Several of the above-mentioned linear amines have high stability coefficients for specific cations. For example, the stability coefficients for tetraethylenepentamine with cations of nickel, copper, lead, and zinc are reported to be $10^{17.6}$, $10^{23.1}$, and $10^{15.3}$, respectively. These linear amines are liquids at ambient temperatures, and they are soluble in water solutions. They have been immobilized by chemically binding them to silicate surfaces to produce insoluble particles that will form complexes with and retain such selected cations. Thus, that simple amines will form highly stable complexes with cations is well known. If a simple amine were immobilized by chemical bond attachment, it would be expected to retain the ability to form a metal-cation complex at least to a limited degree.

Techniques for binding an amine to silicon dioxide or silicon hydroxide, including glass, to aluminas, and to other insoluble elemental oxides are known. For example, the amine may be reacted with chloropropyltrimethoxysilane, chloropropyltriethoxysilane, or any combination of chloromethyl, or -ethyl, or -propyl, or -butyl etc. with any combination of mono- or di- or tri- methoxy or ethoxy or propoxy, or hydroxy, etc, plus binding of the silane to the silicon dioxide, as a method of immobilizing ligands as a solid phase. Specifically, the immobilization of tetraethylenepentamine by this technique is known from Czech Pat. No. 177,563 to Popus Vynalezu. It is also known from U.S Pat. No. 4,203,952 to Hancock to bind a polyamine such as triethylenetetramine to silica by use of the coupling agent alpha-chloropropyl trimethoxy silane and to use this resulting bound ligand as a metal chelating agent. The same method has been used to immobilize monamine and ethylene diamine, and these products have been used as metal chelating agents. U.S. Pat. No. 4,448,694 to Plueddemann employs this method to bind both ends of the amine to the silica.

Polyethyleneimine (PEI) is composed of amines of the type $H_2N[(CH_2)_mNH]_nH$, where $m=2$ to 5 and $n=8$ to 1200. These PEIs have been prepared with molecular weights as high as 60,000. PEIs are produced in large quantities in molecular weight ranges of 1,200 and of 50,000. These larger molecules, in molecular weight ranges from about 400 to 60,000 probably are branched and cross linked, rather than being in absolute linear form. All the molecular weight ranges are referred to as polyethyleneimine of specified average molecular weight, such as PEI-1200.

PEI is extremely viscous. Ions diffuse through and into PEI very slowly. Generally, for this reason, PEI has not been useful as an organic solvent. Similarly, PEI generally has not been a likely choice to be adsorbed in the pores of physical adsorbents such as charcoal or clay, since it could be foreseen that a low diffusion rate of ions into PEI would inhibit the ion complexation to the degree that a useful application of the material would be difficult.

Polyethyleneimine has been known to be linked to silica surfaces, which has made polyethyleneimine useful as a chromatographic column packing and in the purification and separation of anions. For example, U.S. Pat. No. 4,540,486 to Ramsden discloses the preparation of a product that is polyethyleneimine bound by silane to silica gel. This product is formed of silica gel having an average particle diameter of from about three to seventy microns. Apparently, this relatively small particle diameter is desirable in a chromatographic column, although such small particles might be expected to cause a high pressure drop. It could be expected that the smallness of the particles would permit the loading of particles into extremely small columns, and ions rapidly could diffuse into small particles. Thus, such small particles might be desirable in an analysis-process chromatographic column, which requires rapid diffusion.

The process of making the Ramsden product employs the reaction of polyethyleniminopropyl trimethoxy silane with silica gel. The reason for reacting the PEI with silane before bonding to the silica gel is not stated, although it may be to avoid cross-linking in the product. The absence of cross-linking apparently is important to the usefulness of product, according to the Ramsden disclosure.

The Ramsden patent includes further teaching that ion selectivity is known to the extent that carboxylated polyethyleniminopropyl-silyl-silica gel will complex the cations of proteins. Further, polyethyleniminopropylsilyl-silica gel will complex anionic protein solution.

A related disclosure is found in European Patent No. 403,700 to Baker, Inc., in which a covalently bound, non-crosslinked PEI silica based solid phase support serves as an affinity chromatography matrix that is stable in various environments and is selective in adsorption of specific molecules.

The preparation of surface-modified silicas for use as ion-exchangers is disclosed in Janzen, Unger, Muller and Hearn, Adsorption of Proteins on Porous and Non-porous Poly(ethyleneimine) and Tentacle-Type Anion Exchangers, Journal of Chromatography, 522 (1990) 77-93.

A known application of immobilized simple linear amines is the complexation retention of ions, such as the generally unwanted ions of bismuth, cobalt, chromium, copper, gold, iron, lead, mercury, nickel, radium, silver, tin, and zinc at small concentrations of those ions, even in parts per billion, while not appreciably complexing the harmless ions of sodium, potassium, calcium and magnesium at concentrations even thousands of times greater. Because the immobilized-ligand capacity is not taken up by the harmless ions, the loading-cycle time of the ligand before it is fully loaded can be longer, and less ligand material is needed than if both the unwanted and the harmless ions were removed together.

Silica gel has been used as a silica substrate because silica gel has large surface areas. One kilogram of silica gel can have as much as 600,000 square meters of surface in the internal pores of the silica gel particle. It is estimated that one gram mole of an amine, when bound chemically in a single molecule thick layer, would cover approximately 350,000 square meters of silica gel surface. If the average complexation were one cation to each molecule of the amine, then the combination of a kilogram of silica gel bound to one gram mole of tetraethylenepentamine would complex and retain one gram mole of a heavy metal such as copper. The loading would be 63.5 grams of copper on one kilogram of dry silica gel. However, the pores of silica gel have small diameters, and it may be a slow process for molecules to penetrate them. Thus, it is possible that portions of the large surface area cannot be used to bind PEI and, consequently, will not be available to bind metal cations. In practice, the effective useable surface area of the silica gel is less than 350,000 square meters per kilogram, and cation complexing capacities of various tested silica gel immobilized simple amines, from the ethylenediamine to the tetraethylenepentamine are in the range of 0.05 to 0.3 gram moles of cation per kilogram of dry silica gel.

The use of coarse particles of silica gel, larger than those mentioned in the Ramsden patent, has been known to produce unsatisfactory results when bound to large amines such as PEI. It has been thought that coarse silica gel particles do not allow PEI molecules to diffuse adequately into them to produce high complexation capacities. In some cases, especially when the PEI has a molecular weight of about 50,000, the product is a gummy mass that has even lower complexation capacity, due to the adherence between particles. Some or all of these problems may account for the general belief in the art that PEI must be bound to relatively small silica gel particles.

It would be desirable to be able to effectively link PEI with larger particles of silica gel, especially those having a size ranging from about 200 mesh to about 20 mesh, which corresponds to a diameter range of about 74 microns to about 250 microns. Such larger particles would enable bound PEI to be employed in applications requiring less pressure drop than is created with smaller particles. Thus, for example, large volume applications would be possible.

Also, it would be desirable to employ a narrow screen fraction of relatively large silica gel particles with PEI. A narrow screen fraction eliminates excessive fines that might block interstices in a treatment bed.

Further, it would be desirable to have available a method of binding PEI to large particles of silica gel without producing a gummy mass. Generally, large volume applications are benefitted by maintaining a low pressure drop across the treatment bed.

To achieve the foregoing and other objects and in accordance with the purpose of the present invention, as embodied and broadly described herein, the class of compounds, method of manufacture, and method of use of this invention may comprise the following.

DISCLOSURE OF INVENTION

Against the described background, it is therefore a general object of the invention to provide a method of removing metal ions from solution by use of an immobilized, selective ion exchanger having an inorganic substrate as its base. A more specific object is to employ polyethyleneimine as the ion exchanger.

In order to produce a useful immobilized polyethyleneimine, it is an object of the invention to effectively link PEI with large particles of silica or silicate, especially silica gel, especially those particles having a size ranging from about 200 mesh to about 20 mesh. These large particles enable bound PEI to be employed in applications requiring low pressure drop, such as volume applications.

Another object is to employ immobilized polyethyleneimine for metal ion extraction, in such a way that it will have complexing capacity greater than has been achieved with simple linear amines.

A related object is to employ immobilized polyethyleneimine having a molecular weight greater than 1200 and preferably in the range from 1,200 to 60,000, linked to large silica particles, while avoiding production of a gummy mass.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, a method for removing preselected metal ions from solution requires selecting a substrate from the class consisting of silica and silicate materials, having an average size of +200 mesh particles. The substrate is treated to attach a silane linking compound to it. A polyethyleneimine also is selected, having a complexing capacity for the preselected metal ions. After the silane linking compound has been attached to the substrate, the selected polyethyleneimine is chemically bonded to the substrate via the silane linking compound, thereby creating an immobilized polyethyleneimine. The immobilized polyethyleneimine is exposed to a solution containing the preselected metal ions, and this exposure is continued until of at least some of the metal ions are complexed by the immobilized polyethyleneimine.

BEST MODE FOR CARRYING OUT THE INVENTION

The invention resides in the creation and use of immobilized polyethyleneimine (PEI) to chelate heavy metal ions. The PEI of the invention includes amines of the type $H_2N[(CH_2)_mNH]_nH$, where $m=2$ to 5 and $n=8$ to 1200. These PEIs have been prepared with molecular weights as high as 60,000 and are produced in large quantities in molecular weight ranges of 1,200 and of 50,000. These larger molecules, in molecular weight ranges of 400 to 60,000 probably are branched and cross linked, rather than being in absolute linear form. All the molecular weight ranges are referred to as polyethyleneimine of specified average molecular weight, such as PEI-1200.

In the product of the invention, the PEIs are believed to be bound to a silica substrate in a single molecule thick bound layer. Such a layer is deeper than the bound layer of simple linear amines with molecular weights of less than 400. Although the ion complexation capacity of PEIs might not increase in direct ratio to the molecular weight, a useful capacity increase is produced by immobilizing polyethyleneimine, as compared to tetraethylenepentamine or the smaller amine molecules. The ion diffusion through polyethyleneimine molecules bound in such a way as to have a small but highly exposed surface area is substantially greater than ion diffusion into the small pores of a substrate with larger but less exposed surface. Thus, the PEIs of the invention have an improved resultant ion complexation capacity per kilogram.

A PEI molecule with a molecular weight of 1200 has a diameter almost twice that of a tetraethylenepentamine molecule. The latter ligand is known to be chemically bound to the surfaces of silica gel pores to produce a useable chemically bound silica base ligand. By comparison, binding a PEI molecule of significantly higher molecular weight has proven to be surprisingly practical, since the larger PEI molecule would not be expected to pass readily into the pores of silica gel. Thus, the binding of PEI molecules is believed to be largely occurring on the exposed surfaces of the silica gel. The improved utility of the invention benefits from. The greater ion complexing capacity of the PEI molecule, which more than compensates for any reduced surface area coverage.

The reason why binding PEI produces an immobilized amine with a greater capacity than the binding of simple linear amines can be speculated to relate to thickness of the bound layer. The capacity increase might be in the ratio of the thickness of the one molecule thick layer of the PEI up to a molecular weight of 1,000 to 2,000. If other factors are assumed to be equal, the thickness of the bound layer, and thus the capacity, might increase as the cubic root of the molecular weight of the PEI molecules. Thus, it can be projected that immobilized polyethyleneimine of molecular weight 1,200 might have a greater capacity than immobilized tetraethyleneamine of a molecular weight of 189, in the ratio of $(1200/189)^{0.333}$, which would be about 1.85.

Silica gel is used as a substrate because of its large surface area per unit of weight of the substrate. Other silica materials such as glass, clays, quartz, various forms of silica, and silicates, and other oxides of elements that can be reacted with a silane, such as alumina, also can be used as the substrate.

The substrate is formed of a narrow screen fraction of relatively large silica gel particles. The preferred narrow screen fraction ranges from particles not smaller than 200 mesh (74 microns) and usually not smaller than 60 mesh (250 microns). The average size of the substrate particles should be +200 mesh. It is desirable that the particles sizes be −20 mesh (841 microns) +35 mesh (500 microns); and −35 mesh (500 microns) +60 mesh (250 microns). The narrow screen fraction eliminates excessive fines that might block interstices in a treatment bed.

The silica or silicate substrate is prepared to receive the PEI by first attaching a silane linking compound to the substrate. Typically, the linking compound has a propyl bridge that will serve as a separating means between the silica and the polyethyleneimine. Subsequently, the PEI is attached to the silane compound to produce the bound silane-PEI compound on the substrate. The attachment between the polyethyleneimine and the linking compound is by a nitrogen of the polyethyleneimine covalently bonded to a carbon chain arm of the propyl bridge of the linking compound. The separation achieved by the linking compound, especially by the propyl bridge, is believed to sufficiently isolate the PEI from the silica surface that adequate complexation still is achieved. The general formula for the bound compound is:

$$-O-Si-(A)-NH(BNH)_nH$$

where (A) is $(CH_2)_{1 \text{ to } 15}$; (B) is $(CH_2)_{1 \text{ to } 6}$; and n is a number such that the molecular weight of $NH(BNH)_n$ is greater than 400. Amines having molecular weight in the general range of 1200 or more are preferred, with the best utility being with molecular weights in the range of up to 50,000.

The immobilized PEI composition is used to treat fluids by exposing the fluid to the immobilized PEI. One technique for achieving this exposure is to place the immobilized PEI in a column and pass the fluid through the column. A variation of this technique is to place the immobilized PEI in a bed where it can be fluidized. The bed can be fluidized by using a stream of the fluid, and the fluid then is passed through the fluidized particles of the bed.

Ions that are complexed on the immobilized PEI can be removed in a separate treatment with a means for decomplexing the complexed ions. For example, the immobilized amines can be exposed to a stream of a second fluid, which is a material that decomplexes the complexed ion. Such a solution may be of acid or base. For example, the second stream may be nitric acid, hydrochloric acid, sulfuric acid, sulfamic acid, ammonium hydroxide, sodium thiosulfate, a soluble cyanide, or a chelating material that is soluble in the second stream, such as EDTA. The choice of regeneration chemical depends upon the ion being removed.

In most applications, it is desirable that the concentration of the specified ions in the regenerant stream be higher than in the original, treated fluid stream. However, some applications are contrary. The regenerant solution can have a specified ion concentration lower than in the original treated fluid when, for example, it is desired that the specified ion in the regenerant solution be accompanied by fewer unwanted ions that were in the original, untreated, loading solution.

After ions have been removed from the original fluid and recovered in the regenerant solution, there are at least two methods of removing the ions from the regenerant solution. First, when the ion is in a suitable form, concentration, and purity, the elemental metal or a suitable compound of the metal can be electroplated from the regenerant solution. Recovering the metal by electrowinning produces a metal that can be returned to commerce as recycled scrap. Second, the removed ion in the regenerant solution can be precipitated by the addition of anions that form a precipitate with the removed ion. The "filter cake" of the precipitate can be so created that the removed-ion concentration can be high enough that the filter cake can be delivered to a smelter or chemical processor for production of the elemental metal or for production of valuable compounds of the metal. If recovery of the metal from the filter cake is not practical economically, the filter cake can be placed in long term safe, legally-approved storage. Because of the high concentration of the removed ion in the cake produced from the regenerant solution, the volume of the filter cake that must be stored for a long term is reduced, and long-term storage is lest costly.

EXAMPLE 1—PREPARATION OF IMMOBILIZED POLYETHYLENEIMINE (A) To 200 grams of silica gel (Fluka ChemikaBiochemika, catalogue No. 60741, particle 0.063–0.2 mm surface area (BET) 514.0 M²/gram, mean pore diameter 6.5 nm) suspended in 1600 ml of xylene (A.R. grade), 40 ml of distilled water was added and the mixture was stirred for four (4) hours with a mechanical stirrer. To that mixture 200 ml of 3-chloropropyl trimethoxysilane (Fluka ChemikaBiochemika, Catalogue No. 26250) was added and the stirred suspension was heated at 80° C. for six (6) hours under nitrogen atmosphere. The solvent was removed by vacuum filtration and the product was dried at 50° C. under vacuum.

(B) A solution of 15 grams of polyethyleneimine (Aldrich catalogue No. 18,197-8, 50 weight percent solution in water, average molecular weight 50,000-60,000 gram/mole) in 45 ml of methanol (A.R. grade) was added to 15 grams of the modified silica gel (A). The suspension was refluxed, without stirring, under a nitrogen atmosphere for twenty-two (22) hours. The solution was removed by vacuum filtration, the product was washed four times successively with hot methanol, and the product then was dried at 50° C. under vacuum.

(C) In a similar manner to (B), 1.5 grams of polyethyleneimine in 45 ml of methanol was added to 15 grams of the modified silica gel (A). The suspension was refluxed, without stirring, under a nitrogen atmosphere for twenty-two (22) hours, and then treated as above in (B).

Before use, both (B) and (C) were preconditioned by two (2) washes with 50 ml of 0.05 M HCL, two washes with 50 ml of 0.05 M NaHCO₃, 50 ml of distilled water, 50 ml of ethanol, and 50 ml of acetone, then dried at 50° C. under vacuum.

EXAMPLE 2—LOADING STUDIES

Loading studies on immobilized polyethyleneimine were performed in the following manner. An aqueous solution of metal nitrate (5 to 20 ml) of known concentration (0.0005 to 0.3 mole/liter) was added to the polyethyleneimine-modified silica beads (0.1-0.5 grams) of Example 1, and this mixture was shaken for fifteen (15) minutes. At the end of this time, the metal ion concentration of the solution, which was in equilibrium with the silica beads, was determined by atomic absorption spectrophotometry analysis. In all cases the initial metal present was never less than the amount required to occupy all of the complexation sites on the modified silica. The metal ion uptake was determined from the difference in the metal ion concentration in solution before and after loading. In all cases the results from the replicates experiments were found to fall within 10% of each other.

TABLE 1

LOADING STUDIES OF IMMOBILIZED POLY(ETHYLENEIMINE)

| MODIFIED SILICA (B) | | 32 MODIFIED SILICA (C) | |
|---|---|---|---|
| Equilibrium Concentration (mole/liter) | Loading (gram moles of Cu(II) per Kilogram of silica) | Equilibrium Concentration (mole/liter) | Loading (gram moles of Cu(II) per Kilogram of silica) |
| 0.13219 | 0.77 | 0.20898 | 0.10 |
| 0.03600 | 0.72 | 0.09965 | 0.10 |
| 0.00726 | 0.50 | 0.04638 | 0.10 |
| 0.00214 | 0.38 | 0.00985 | 0.06 |
| 0.00023 | 0.14 | 0.00498 | 0.04 |
| | | 0.00090 | 0.03 |

EXAMPLE 3—SELECTIVE LOADING

In commercial applications, often it is desired to remove heavy metal ions such as bismuth, cadmium, chromium, cobalt, copper, gold, iron, mercury, nickel, radium, silver, tin, zinc and lead, while not removing the ions of sodium, potassium, calcium and magnesium. The silica gel immobilized polyethyleneimines do that very well. Tests to illustrate that selectivity were performed. Solutions of water in 0.2 molar concentration of copper and 0.2 molar concentration of potassium or magnesium were equilibrated with modified silica sample (B) of Example 1 in the manner described in Example 2. The loading of the silica gel polyethyleneimine was:

Comparison 1:

Copper—0.79 gram moles/kg of silica gel polyethyleneimine.

Potassium—Less than the detectable limit of difference.

Comparison 2:

Copper—0.81 gram moles./kg of silica gel polyethyleneimine.

Magnesium Less than the detectable limit of difference.

In the same manner the capacity for other ions was determined with sample (B) of Example 1.

| | |
|---|---|
| Copper (2+) | 0.77 gram mole/kilogram of silica gel polyethyleneimines. |
| Nickel (2+) | 0.19 |
| Zinc (2+) | 0.57 |
| Lead (2+) | 1.05 |
| Sodium (1+) | Less than the detectable limit of difference. |
| Potassium (1+) | Less than the detectable limit of difference. |
| Calcium (2+) | Less than the detectable limit of difference. |
| Magnesium (2+) | Less than the detectable limit of difference. |

EXAMPLE 4—WEIGHT RATIO TESTS

Larger ion complexation capacities are obtained with the immobilization of PEI, as compared with the ion complexation capacity obtained with the immobilization of the same weights of simple linear amines of much lower molecular weights. Tetraethylenepentamine has a molecular weight of 189. PEI with an average molecular weight of 1200 essentially is an assembly of approximately six (6) tetraethylene molecules. The performance of similar weight ratios of the PEI and tetraethylenepentamine, each immobilized on 1,000 grams of silica gel, was determined by the following tests.

TABLE 2

| | WEIGHT RATIOS | | | |
|---|---|---|---|---|
| Run Number | 1 | 2 | 3 | 4 |
| Chloropropyltrimethoxysilane grams/kilogram of Silica Gel | 69 | 99 | 69 | 99 |
| Tetraethylenepentamine grams/kilogram of Silica Gel | 80 | 113 | | |
| Polyethyleneimine grams/kilogram of Silica Gel | | | 87 | 87 |
| Copper Ions Complexation Capacity -- gram moles/kilogram of | 0.216 | 0.247 | 0.414 | 0.389 |

TABLE 2-continued

| Run Number | WEIGHT RATIOS | | | |
|---|---|---|---|---|
| | 1 | 2 | 3 | 4 |
| Silica Gel | | | | |

This test establishes that the immobilized PEI performs far better than should be expected. While it might have been expected that the PEI would have less capacity than the TEPA, the test results show that PEI has almost twice the ion complexation capacity of a similar amount of TEPA.

EXAMPLE 5—LOW-ION-CONCENTRATION COMPLEXING TEST

The operation of the invention is demonstrated when heavy metals are in very low concentrations. In a test of ion complexing ability with low ion concentrations, the immobilized polyethyleneimine of Example 1 first was screened so as to be mostly of −20 mesh to +35 mesh particle size. Then, 2.23 kg of the screened silica-gel-immobilized polyethyleneimine was placed in a column of 10 cm inside diameter and a column height of 62.5 cm. Tests had shown that the particles had a cation-complexing capacity of 0.2 grams moles per kilogram of product material. The total bed volume was 4909 cubic centimeters. This column and the supporting pumps, valves, tanks, and instruments were installed at a metal plating plant for testing.

Rinse water, used to clean plated items from an "electroless nickel" plating line, was pumped through this a first day and for eight hours per day on three subsequent days. The effluent from the column was returned to the rinse water tank. Samples of treated effluent from the column were removed and analyzed. When analyses indicated that the nickel concentration of the immobilized ligand was beginning to increase, and that the ligand might be loaded to a good fraction of its capacity, the flow of nickel-laden rinse water was stopped, and the column was regenerated. The regeneration procedure consisted of pumping through the bed five liters of a 2% solution of sulfuric acid solution, followed by ten liters of water, and then by five liters of a 2% solution of sodium bicarbonate, each at a flow rate of approximately two liters per minute. This was repeated for four cycles. The nickel removal performance of the column improved slightly with increasing cycles. During four days the rinse water was treated and recycled for 28 hours, and 3,588 square feet of nickel-plated surface was rinsed. Analyses of the influent and effluent from the immobilized bed were:

TABLE 3

| NICKEL ION CONCENTRATION (PPM) | | | |
|---|---|---|---|
| Day | Time | *Influent Solution | *Effluent Solution |
| Day 1 | 1:30 p.m. | 3.6 | 0.1 |
| | 3:30 p.m. | 3.0 | 0.1 |
| Day 2 | 9:40 a.m. | 1.0 | 0.0 |
| | 12:00 p.m. | 1.2 | 0.04 |
| | 2:00 p.m. | 2.0 | 0.04 |
| | 3:30 p.m. | 2.7 | 0.05 |
| Day 3 | 10:00 a.m. | 0.55 | 0.05 |
| | 12:00 p.m. | 1.3 | 0.06 |
| | 2:00 p.m. | 3.4 | 0.075 |
| | 3:35 p.m. | 4.0 | 0.10 |
| Day 4 | 10:00 a.m. | 1.0 | 0.09 |
| | 12:00 p.m. | 3.75 | 0.11 |
| | 2:00 p.m. | 3.0 | 0.15 |
| | 3:35 p.m. | 6.0 | 0.3 |

*Influent Solution - Concentration of nickel in the rinse water tank and, therefore, as entering the immobilized ligand bed, in parts-per-million (ppm).
*Effluent Solution -- Concentration in ppm of nickel in the rinse water after passage through the immobilized ligand bed.

The superficial velocity of the rinse water passing through the bed was 11.5 gallons per minute per square foot of cross section (48.2 centimeters per minute). It was estimated that only 20% of the volume of the entire ligand-particles bed is the interstices through which the solution passes. Actual contact time of the rinse water solution with the ligand was fifteen seconds, approximately.

Projected capacity of the 2.23 kilograms of the silica gel-polyethyleneimine is 0.4 gram moles of nickel, approximately. The apparent loading of the bed was 0.2 gram moles of nickel, approximately.

According to continuing aspects of this test, the regeneration solution flow rates were reduced to about 40 milliliters per minute. In some periods in the regeneration procedure, acid solution was pumped in to fill the interstices between the particles, after which pumping will cease for a period of one hour to two hours, to allow the acid adequate time to react with the immobilized PEI and release the nickel more thoroughly.

The examples establish that immobilized PEI is an extremely effective complexing material. When immobilized on silica gel or like supports, the PEI has been transformed into a solid-phase complexing material in which the PEI is bound chemically, such as by covalent bonding, to the surfaces of silica. As a result, this PEI-silica compound is not soluble in water, is not washed off by water, and cannot dissolve in water. Consequently, the properties of PEI can be applied in situations where not formerly possible.

A surprising aspect of this invention is its utility in complexing ions. The PEI is bound chemically to the surfaces of silica materials via at least one nitrogen in the PEI molecule. In view of this bond, high ion complexation capacity would not be expected. Heavy metal ion complexation typically occurs because of association with a nitrogen that has at least one hydrogen exposed. Therefore, the experimental results show an unexpectedly high complexation capacity, in view of the chemical binding between the PEI and silica gel occurring at one or more nitrogens. Tests have shown that the PEI composition has a greater complexation capacity per total unit weight of the amine than is found with a simple linear amine.

It appears that the major ion coordination sites on the PEI molecule are not suppressed by chemical bonding of the nitrogen to a carbon chain arm that is chemically bound to silica. The PEI appears to be sufficiently silated from the silica surface by the propyl bridge between the silica and the nitrogen that adequate complexation still is attained.

Finally, an important economic aspect of the invention is that the PEI is bound to an inorganic substrate. In the pat, various ligands have been attached to organic polymers, but these are difficult to synthesize in a manner that maintains the ion coordination properties of the ligand. Generally, the plants and chemical process equipment are expensive when such organic substrates are used. Further, the substrate constitutes a large fraction of any product composed of a ligand bound to a substrate. Organic polymer substrates generally cost more than inorganic, silica substrates, which makes organic polymer bound ligands very expensive. Yet, the substrate does not contribute to the ion complexation capacity. It can be seen that the potential for using silica and other inorganic materials as a substrate, and thus reducing the cost of the final bound ligand is one of the driving forces in the search for immobilized ligands that do not have a reduced capacity.

The foregoing is considered as illustrative only on the principles of the invention. Further, since numerous modifications and changes will readily occur to those skilled in the art, it is not desired to limit the invention to the exact construction and operation shown and desired and accordingly all suitable modifications and equivalents may be regarded as falling within the scope of the invention as defined by the claims that follow.

We claim:

1. A method of removing preselected metal ions from solution, comprising:
    selecting a substrate from the class consisting of silica and silicate materials, having an average size of +200 mesh particles;
    attaching a silane linking compound to said substrate;
    selecting a polyethyleneimine having a complexing capacity for the preselected metal ions;
    after said step of attaching the silane linking compound, chemically bonding said selected polyethyleneimine to the substrate via the silane linking compound, thereby creating an immobilized polyethyleneimine;
    exposing said immobilized polyethyleneimine to a first solution containing the preselected metal ions; and
    continuous exposure to said first solution until the immobilized polyethyleneimine complexes at least some of the metal ions.

2. The method of claim 1, wherein said substrate particles are of an average size of +60 mesh.

3. The method of claim 1, wherein said substrate particles are of a size of −20 mesh +35 mesh and −35 mesh +60 mesh.

4. The method of claim 1, wherein said polyethyleneimine has a molecular weight greater than 400.

5. The method of claim 1, wherein said polyethyleneimine has a molecular weight greater than 1200.

6. The method of claim 1, wherein said polyethyleneimine has a molecular weight greater than 50,000.

7. The method of claim 1, wherein said polyethyleneimine has a molecular weight in the approximate range of 50,000 to 60,000.

8. The method of claim 1, wherein said silanepolyethyleneimine compound is of the formula:

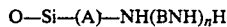

where (a) is $(CH_1)_{1 \text{ to } 15}$; (B) is $(CH_2)_{1 \text{ to } 6}$; and n is the number such that the molecular weight of $NH(BNH)_n$ is greater than 400.

9. The method of claim 1, wherein said step of exposing the immobilized polyethyleneimine to a first solution containing the preselected metal ions comprises: placing the immobilized polyethyleneimine in a bed and passing said first solution through the bed in a first stream.

10. The method of claim 9, further comprising: fluidizing said bed with said first stream of said solution.

11. The method of claim 1, after said step of continuing exposure to the solution until the immobilized polyethyleneimine complexes at least some of the metal ions, further comprising:
    decomplexing the complexed ions by exposing the immobilized polyethyleneimine to a means for decomplexing the complextions.

12. The method of claim 11, wherein said decomplexing means comprises a second solution of regenerant material that decomplexes the complexed ions.

13. The method of claim 12, wherein said decomplexing means comprises a second solution selected from the group consisting of an acid, a base, nitric acid, hydrochloric acid, sulfuric acid, sulfamic acid, ammonia, sodium thiosulfate, cyanide, chelating material soluble in the second solution, and EDTA.

14. The method of claim 12, further comprising: removing ions from said second solution by an electroplating process.

15. The method of claim 12, wherein said decomplexing step if continued until the concentration of the decomplexed ions in the regenerant material is greater than in said first stream.

16. The method of claim 12, wherein said decomplexing step is continued only so long as the concentration of the decomplexed ions in the regenerant material is less than in said first stream.

* * * * *